Dec. 29, 1959

R. E. DELAMATER 2,918,720

CUTTING TOOL SUPPORT

Filed Nov. 17, 1958

INVENTOR.
ROLAND E. DELAMATER
BY
WATTS & EDGERTON
AH Edgerton
ATTORNEYS

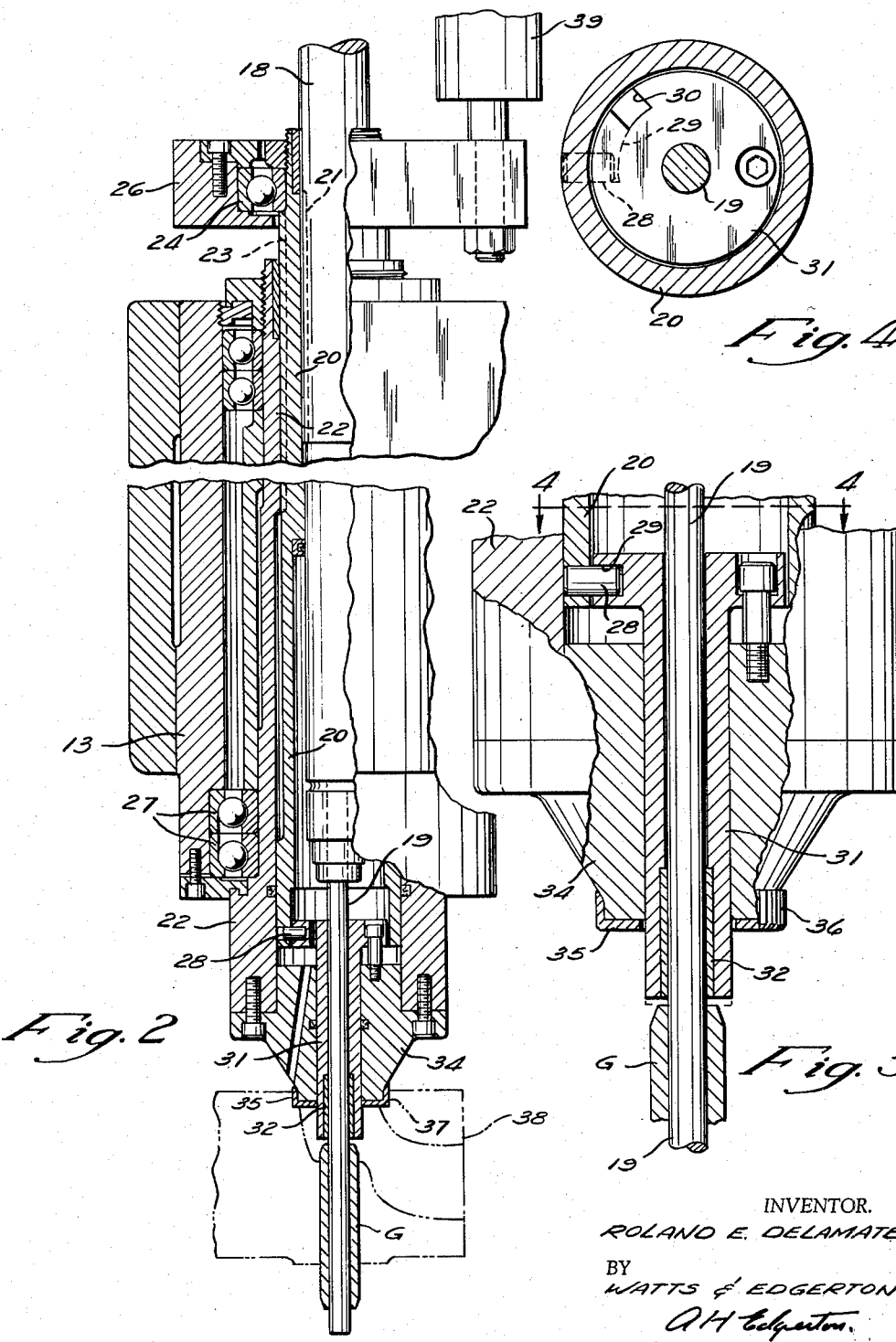

United States Patent Office 2,918,720
Patented Dec. 29, 1959

2,918,720

CUTTING TOOL SUPPORT

Roland E. Delamater, Cleveland Heights, Ohio, assignor to The Foote-Burt Company, Cleveland, Ohio, a corporation of Ohio Application November 17, 1958, Serial No. 774,237

6 Claims. (Cl. 29—26)

This invention relates broadly to machine tools, and more specifically to improvements in cutting tool bushings adapted for movement into cutter supporting position during the operation of the tool.

The primary object of the invention is to provide a reciprocative sleeve having a guide bushing or steady rest thereon that may be advanced and retracted towards the working end of a cutter during the operation thereof.

Another object of the invention is to provide a machine tool embodying a vertical or horizontal boring bar for the finish cut on valve stem guides in automobile cylinder heads or cylinder block castings, and a reciprocative guide bushing on said boring bar for supporting the boring bar while it is making the finish cut on valve stem guides. This reciprocative guide bushing is mounted in sleeve telescopically supported in the tool which counterbores the cylinder head or cylinder block for a valve seat insert.

Other objects of the invention reside in the structure of a reciprocative guide mechanism which is efficient of operation, economic of manufacture and adapted to perform its operative function with precision and dispatch.

Other objects and advantages more or less ancillary to the foregoing, and the manner in which all the various objects are realized, will appear in the following description, which considered in connection with the accompanying drawings, sets forth the preferred embodiment of the invention.

Referring to the drawings:

Fig. 2 is an enlarged sectional view of a portion of the head of the machine;

Fig. 3 is a sectional view shown on a further enlarged scale of a fragmentary portion of the boring tool and associated parts; and Fig. 4 is a transverse sectional view of the bushing supporting structure, the section being taken on a plane indicated by the line 4—4 in Fig. 3.

Figure 1:
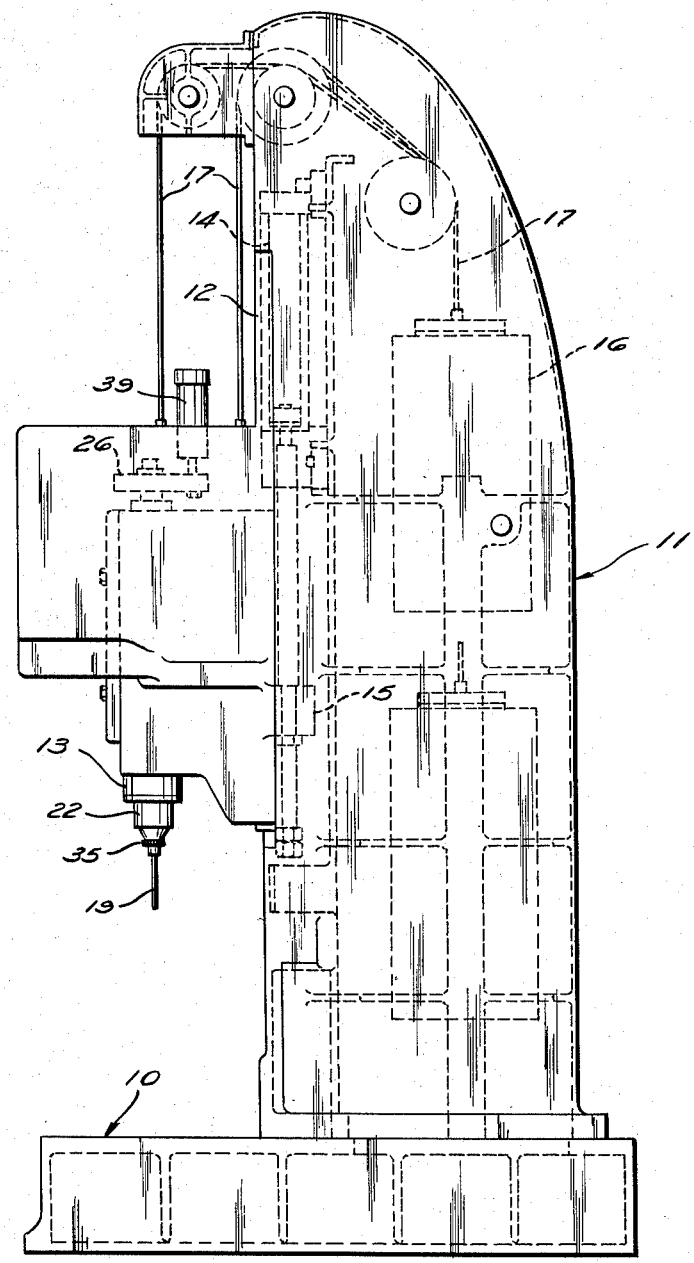
Fig. 1 is a side elevational view of a machine tool embodying a vertical or horizontal boring bar for a boring operation on valve stem guides, and a reciprocating sleeve for a bushing that supports the boring tool.

Referring first to Fig. 1, the machine comprises a base 10 having a vertical column 11 thereon, ways or bars 12 formed in the forward face thereof, and a sliding head 13 mounted for reciprocative movement on the ways or bars.

The head is elevated and lowered by a piston cylinder assembly 14 mounted in the column 11, the piston rod being connected to a boss 15 that protrudes through a slot in the column of the machine. The head is counterbalanced by a weight 16 suspended by chains 17 roved over sheave wheels pivoted in the upper end of the column.

Referring next to Fig. 2, the head is provided with a vertical spindle 18 bored for the support of a boring bar 19, and the spindle is rotatably driven by a hydraulic or electric motor (not shown) mounted in the head 13. A sleeve 20 is telescopically engaged with the spindle 18 and is mounted for vertical or horizontal sliding movement relative thereto by integral splined keys 21. A second sleeve 22 telescopically engages the sleeve 20 and is splined thereto by integral keys 23. The sleeve 20 is supported in an antifriction bearing 24 in a bracket 26 for controlling the vertical movement of the sleeve, and the second sleeve 22 is retained in antifriction bearings 27 mounted in the head 13. The lower end of the sleeve 20 is cross bored to receive a pin 28 engaged with a slot 29 and a vertical opening 30 constituting a bayonet lock in the flanged upper end of a bushing-supporting tube 31 that envelops the boring bar 19. The lower end of the tube 31 is provided with a tungsten carbide bushing 32 having a bore therein that is ground for free reciprocative movement with the shank of the boring bar. The sleeve 22 is telescopically engaged and affixed to a pilot bearing 34 on the upper end of a cutting tool head 35. The cutting head is provided with a plurality of insert cutter blades 36 ground to cut a recess 37 for valve seat insert castings in an automobile cylinder head or cylinder block 38 shown in dot-dash lines in Fig. 2. This drawing further illustrates the valve stem guide bushings G pressed in place in the cylinder head or cylinder block casting.

The bracket 26 is connected to a hydraulic piston cylinder assembly 39 connected to a source of power fluid and valve mechanism (not shown) to effect the actuation of the piston in a predetermined sequential order relative to the movement of the piston in the cylinder assembly 14.

In operation, the head 13 is lowered by actuation of the piston in the cylinder assembly 14 so that the rotating cutting tool head 35 and blades 36 can counterbore the valve seat insert recess in an automobile cylinder head or cylinder block casting. After completing this cut, the tool is raised just high enough to clear the work, and the piston in the cylinder assembly 39 is actuated to lower the sleeve 20 into a position approximately one-sixteenth of an inch above the top of the valve stem guide bushing G. This will afford maximum support to boring bar 19 while it is brought down by spindle 18 to perform the finish cut in valve stem guide bushing G.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. In a machine tool embodying a reciprocative tool slide, a rotative boring spindle therein, a boring bar in said spindle, a sleeve telescopically engaged with said spindle, a bushing in said sleeve, hydraulic means for reciprocating said sleeve, a second sleeve telescopically engaged with the first named sleeve and splined thereto, an end cutting tool secured on the end thereof, and a second hydraulic means independent the first named hydraulic means for reciprocating said slide.

2. In a machine tool embodying a vertical slide thereon, a rotary spindle therein, a boring bar supported thereby, a sleeve splined to said spindle, a bushing therein, a second sleeve splined to said first named sleeve, an end cutting tool thereon, means for feeding said first named sleeve downwardly, and means for moving said second named sleeve downwardly subsequent the descent of said first named sleeve.

3. In a machine tool embodying a vertical slide, hydraulic means for reciprocating said slide, a rotative spindle in said slide, a boring bar in said spindle, a sleeve telescopically engaged with said spindle and splined thereto, a bushing in the lower end of said sleeve, a second sleeve detachably connected to the first named sleeve, a second hydraulic means independent of the first named hydraulic means for reciprocating the first named sleeve, and an end cutting tool secured to the end of said second sleeve.

4. In a machine tool embodying a reciprocative slide, a rotary boring spindle therein, a boring tool in said spindle, a sleeve telescopically engaged with said spindle and splined thereto, a bushing in said sleeve engaged with said boring tool, hydraulic means for reciprocating said sleeve, a second sleeve telescopically engaged with the first named sleeve and splined thereto, an end cutting tool secured to the end of the second named sleeve, a second hydraulic means operable independent the first named hydraulic means for reciprocating said slide, said first named sleeve traversing said boring tool with the bushing therein supporting the end portion of the first named sleeve when said end cutting tool is in its operative position.

5. In a machine tool embodying a reciprocative slide, a rotary spindle therein, a boring tool carried by said spindle, a sleeve telescopically engaged with said spindle and splined thereto, a bushing in said sleeve engaged with said boring tool, hydraulic means for reciprocating said sleeve, a second sleeve telescopically engaged with the first named sleeve and splined thereto, an end cutting tool secured to the end of said second named sleeve, a second hydraulic means independent the first named hydraulic means for reciprocating said slide, said first named sleeve and the bushing therein moving downwardly to support said boring tool while said boring tool performs its operative function.

6. A machine tool embodying a vertical slide, a rotary spindle therein, a boring bar supported in said spindle, a sleeve splined on said spindle, a bushing therein, a second sleeve splined to said first named sleeve, an end cutter thereon, a hydraulic piston for lowering said first named sleeve, a second hydraulic piston for lowering said slide, said first named hydraulic piston being actuated to lower said sleeve subsequent the downward actuation of the second named hydraulic piston.

References Cited in the file of this patent

UNITED STATES PATENTS

| | | |
|---|---|---|
| 2,027,385 | Kraut | Jan. 14, 1936 |
| 2,271,717 | Schwartz | Feb. 3, 1942 |
| 2,813,280 | Huffman | Nov. 19, 1957 |
| 2,884,819 | Roubloff | May 5, 1959 |